United States Patent
Chen et al.

(10) Patent No.: US 6,771,042 B2
(45) Date of Patent: Aug. 3, 2004

(54) METHOD AND APPARATUS FOR IMPLEMENTING SMART MANAGEMENT OF A RECHARGEABLE BATTERY

(75) Inventors: Huei-Chiu Chen, Taoyuan Hsien (TW); Wen-Wei Lin, Hsinchu Hsien (TW)

(73) Assignee: Avid Electronics Corp., Hsinchu (TW)

( * ) Notice: Subject to any disclaimer, the term of this patent is extended or adjusted under 35 U.S.C. 154(b) by 50 days.

(21) Appl. No.: 10/302,458

(22) Filed: Nov. 22, 2002

(65) Prior Publication Data

US 2003/0117112 A1 Jun. 26, 2003

(30) Foreign Application Priority Data

Dec. 24, 2001 (TW) ........................................ 90131963 A

(51) Int. Cl.[7] ................................................ H02J 7/00
(52) U.S. Cl. ...................................................... 320/110
(58) Field of Search ............................... 320/114, 110, 320/141, 143, 144, 145, 135

(56) References Cited

U.S. PATENT DOCUMENTS 6,583,601 B2 * 6/2003 Simoes et al. .............. 320/114
6,683,439 B2 * 1/2004 Takano et al. .............. 320/132

* cited by examiner

Primary Examiner—Pia Tibbits
(74) Attorney, Agent, or Firm—Thomas, Kayden, Horstemeyer & Risley, LLP

(57) ABSTRACT

A method and apparatus for implementing a smart management of a rechargeable battery provides the basic capabilities to measure the operating parameters of a rechargeable battery including voltage, temperature and current flow, used subsequently to control the flow of charge/discharge current and for determining the operation mode of the rechargeable battery. The control circuit includes a central processing unit to manage the charge/discharge operation and control the current flow; a trickle charger for slow charging; a cutoff switch to turn off the temperature detector; and an economizer switch to reduce power loss during normal charging of the battery. If the operating voltage of the battery is below a predetermined limit, the system automatically switches to a self-cutoff mode. Through a combination of the above control means, battery management for rechargeable batteries can be improved notably.

16 Claims, 6 Drawing Sheets

METHOD AND APPARATUS FOR IMPLEMENTING SMART MANAGEMENT OF A RECHARGEABLE BATTERY

BACKGROUND OF THE INVENTION

1. Field of the Invention

The present invention is a method and apparatus for implementing smart management of a rechargeable battery. The invention uses the operation data of the rechargeable battery including the voltage, temperature and current flow to manage charging and discharging of the battery in an intelligent manner. The method is a dynamic technique for the management of the rechargeable battery that is able to make appropriate adjustments in response to any change in parameter values of the battery.

2. Description of Related Art

Use of high performance and long life batteries, low power consumption and product miniaturization are on-going objectives in the design of portable electronic devices such as notebook computers, personal digital assistants (PDA) and mobile phones. To further enhance the portability of an electronic product, the first thing a product designer must do is to find a long-life rechargeable battery that is capable of supporting the operation of the product for ten hours or more. However, the miniaturization of electronic products has severely constrained the storage capacity for a battery without sufficient space to accommodate additional rechargeable cells. In addition, designers are trying to package more functions in existing products to make them super versatile. Such devices with increased complexity after incorporating all the additional functions definitely need larger load current than their conventional counterparts. Developing a smart battery management system for rechargeable batteries to cut down unnecessary power loss has become imperative.

Portable electronic products such as notebook computers usually have a built-in battery control circuit to optimize and adjust the current flow during the charging and discharging of the battery. In the conventional method, the control circuit in portable devices works in conjunction with a signal I/O interface to retrieve the parametric values from the battery. These periodically collected data relating to the battery operation are shown to the user of a portable device to make him or her aware of the current operational status of the battery.

The control circuit in conventional battery management is set up with predetermined values for the battery operation parameters. These parameters may be the lower or upper reference voltage, or lower or upper reference temperature. The control circuit then uses the data to control the charge and discharge of the battery. However, a rechargeable battery is usually made of chemical compounds such as a lithium-polymer or nickel-metal. During the operation of a battery, electrochemical reaction takes place simultaneously inside the battery. In the electrochemical process, the basic elements often exhibit non-linear characteristics. Simply by presetting the values of the external control factors such as operating temperature, flow of current during charge or discharge, and the time the battery being used is not adequate to control the operation characteristics of the battery with the design specs.

Specifically, changing in temperature affects the internal ohmic resistance of an electrode in the battery. Higher temperature could cause an increase of internal ohmic resistance, and vice versa, leading to unpredictable variation of the terminal voltage of the battery. Furthermore, longer battery use time could cause an increase in internal ohmic resistance, resulting in improper estimates of the upper and lower voltage limits.

In conventional methods, constant current flow is often used in the process of charging or discharging a battery. According to the charge/discharge characteristic curve of a battery, using a small current to charge a battery is more efficient than a high constant current. Also, using a large current to charge/discharge a battery could produce early saturation or depletion. This phenomenon can be explained by an increasing amount of electric energy being transformed to thermal energy as the battery approaches saturation. It is not economical to charge a battery with a constant current, since this electric energy cannot be efficiently saved in the storage battery. Besides, low ambient temperature or long idling of the battery could cause the electrolyte in the battery to coagulate or produce sedimentation. Under such conditions, charging with excessive current flow could easily damage the battery.

In the conventional method, if the battery is close to depletion in a discharge mode, only a message is issued by the control system to warn users of impending depletion, but the discharging process continues without interruption. As a result, the battery could be over discharged and create irreversible damage, such that the battery cannot be used anymore.

SUMMARY OF THE INVENTION

The main objective of the present invention is to provide a method and apparatus for implementing a smart battery management system on a rechargeable battery. The charging of a battery is carried out in two stages with the assistance of an optimizing charge controller. In the first stage, charging a battery is conducted in the normal mode with a constant flow of current. As the charging of the battery approaches saturation, the charge controller is switched to pulsation-charge mode to charge the battery intermittently. With the smart control, the charging efficiency of a rechargeable battery is improved notably.

The second objective of the present invention is to provide a trickle charger. If the ambient temperature of the battery is below a predetermined lower temperature limit or the terminal voltage is below a predetermined voltage lower limit, the trickle charger is enabled to slowly charge with a small current. The trickle charger serves to activate the electrolyte in the battery in preparation for a normal charge. These control methods can prevent possible harmful charging of the battery with excessive current.

The third objective of the present invention is to provide a discharge controller to protect the battery against over discharge. If the central processing unit detects that the voltage of the battery is below a predetermined lower voltage limit, representing excessive discharge from a battery, it automatically turns off the discharge controller to stop the discharging of the battery and cuts off all load supply current from the battery control circuit, entering a self-cutoff mode.

The fourth objective of the present invention is to provide a cutoff switch. If the central processing unit detects that the battery is not active, it cuts off the load current to the temperature detector to reduce power loss from the battery.

The apparatus necessary for implementing smart management of the rechargeable battery includes a central processing unit, a charge controller, trickle charger, a discharge controller, a cutoff switch and an economizer switch.

The central processing unit is respectively connected to a current flow detector for sensing charge/discharge current flow, a temperature detector for sensing the surface temperature of the battery, and a voltage detector for sensing the terminal voltage across the battery. These parametric values relating to the operational status of the battery collected by the above detectors are saved in an EEPROM.

The optimizing charge controller is connected across the central processing unit and the rechargeable battery. If the battery operates within the normal range of terminal voltage and temperature, the central processing unit activates the charge controller to carry out normal-charge of a battery with a constant current.

The trickle charger is connected across the central processing unit and rechargeable battery. In the charge mode, it can provide slow charge of the battery with a small current to activate the electrolyte in the battery before the normal charging process is initiated.

The discharge controller is connected across the central processing unit and the rechargeable battery. If the terminal voltage of the battery is below a predetermined lower voltage limit during discharging, the central processing unit hereupon issues a control signal to turn off the discharge controller stopping the discharging and turns off the voltage regulator entering a self-cutoff mode.

The cutoff switch is connected to the temperature detector and central processing unit. If the central processing unit detects that the battery is idling, the processor turns off the temperature detector to reduce power loss.

The economizer switch is connected to the rechargeable battery and the central processing unit through the voltage regulator. If the battery is connected to an external power source for recharging, the economizer switch activates the voltage regulator which in turn supplies normal operating voltage to force the system to return to normal operation from the previous self-cutoff mode.

The features and related techniques of the present invention will become more apparent from the description of the preferred embodiment when taken with the FIGS. of the invention.

DETAILED DESCRIPTION OF THE PREFERRED EMBODIMENT

A smart management system for a rechargeable battery in accordance with the present invention is designed for portable devices such as notebook computers and monitors and manages the charging and discharging of a rechargeable battery in an intelligent manner. The operating data of the battery are cyclically retrieved and saved in memory for use by the various control procedures to control the current flow and determine the appropriate operation mode for the battery. Through a signal I/O port in the battery management apparatus, the system is able to establish a data link with a portable device, such that the user is able to obtain updated information relating to the operating status of the rechargeable battery.

Figure 1:
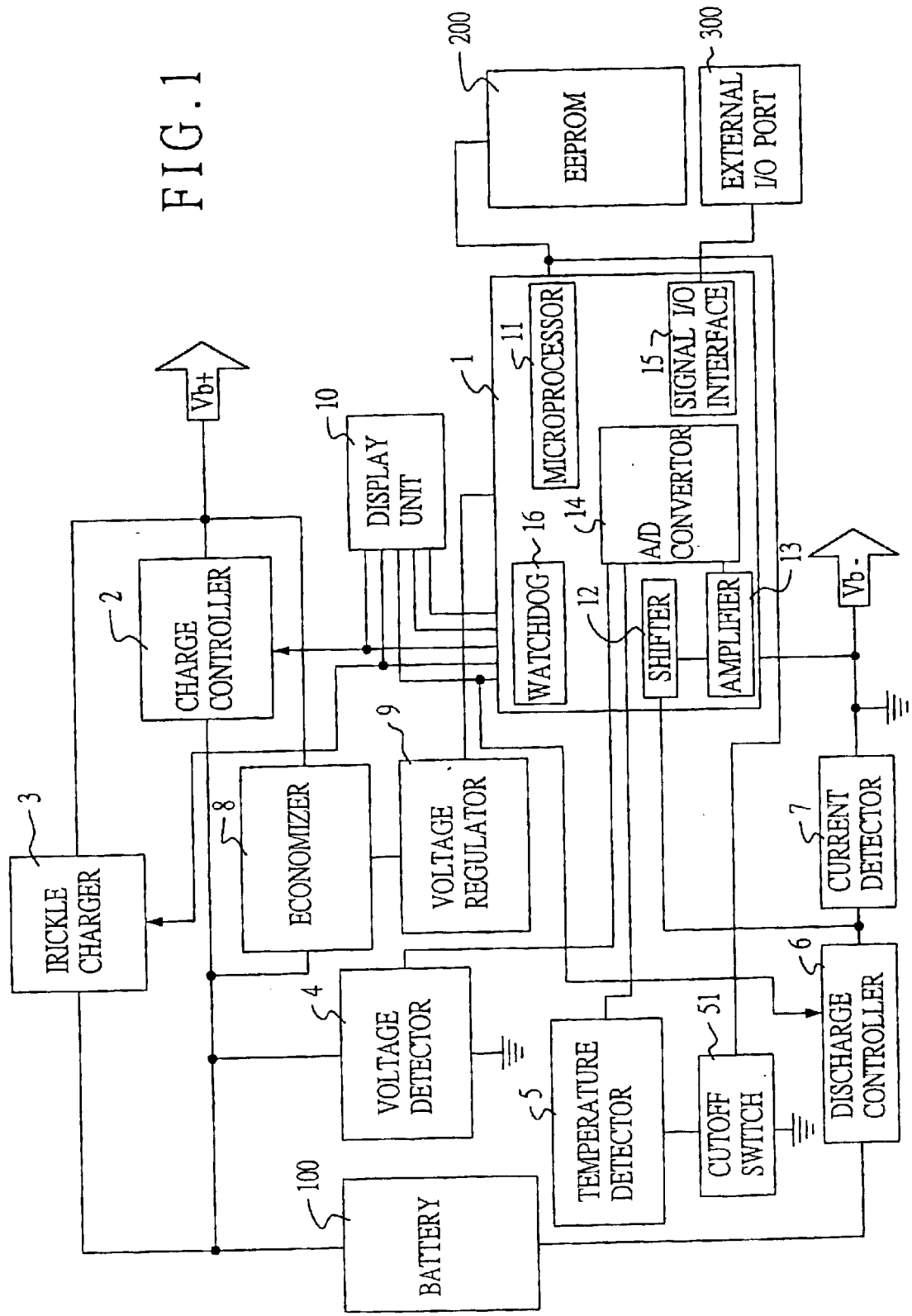
FIG. 1 is a block diagram of the apparatus for implementing smart management of a rechargeable battery in accordance with the present invention.
Figure 2:
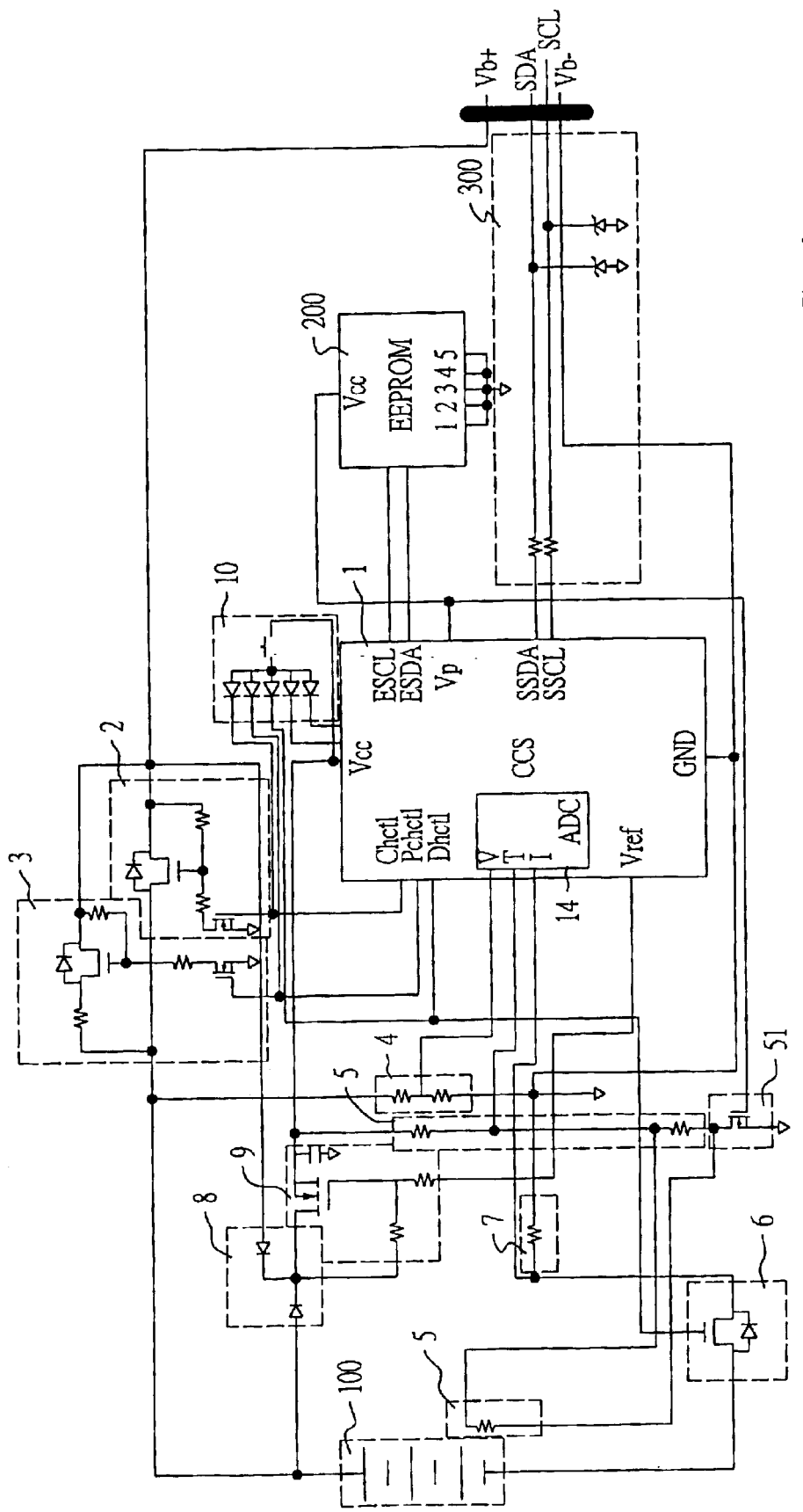
FIG. 2 is a detailed circuit diagram of the apparatus for implementing smart management of a rechargeable battery in FIG. 1.

With reference to FIGS. 1 and 2, the battery management system comprises a central processing unit (1), a charge controller (2), a trickle charger (3), a voltage detector (4), a temperature detector (5), a discharge controller (6), a current detector (7), a cutoff switch (8), a voltage regulator (9), a display unit (10), an EEPROM (200), and an external I/O port (300).

The central processing unit (1) is composed of a microprocessor (11), a level shifter (12), an amplifier (13), an A/D converter (14), a signal I/O interface (15) and a watchdog timer (16).

The charge controller (2) connected to the rechargeable battery (100) and an external power input (Vb+) is controlled by the central processing unit (1) to provide a constant current flow in the charge mode to charge the rechargeable battery (100).

The trickle charger (3) connected to the rechargeable battery (100) and the external power input (Vb+) is also controlled by the central processing unit (1) to slowly charge the rechargeable battery (100) with a small current.

The voltage detector (4) formed by two resistors connected in series is connected across the rechargeable battery (100) and to the A/D converter (14) in the central processing unit (1). By means of the voltage detector (4), the central processing unit (1) is able to monitor the terminal voltage of the rechargeable battery (100). To precisely measure the terminal voltage of rechargeable battery, the software in the central processing unit will compensate the voltage drops along the conductors between cell tips.

The temperature detector (5) formed by a thermalsensitive resistor with negative temperature coefficient is connected to the A/D converter (14) in the central processing unit (1) and grounded through a cutoff switch (51). By means of the temperature detector (5), the central processing unit (1) is able to monitor the surface temperature of the rechargeable battery (100).

The cutoff switch (51) connected in series to the temperature detector (5) is formed by an FET, through which the central processing unit (1) is able to activate or deactivate the temperature detector (5).

The discharge controller (6) is connected across the central processing unit (1) and the rechargeable battery (100). When the rechargeable battery (100) is switched to a discharge mode, the central processing unit (1) enables the discharge controller.

The current detector (7) formed by a resistor with low ohmic resistance is connected to the central processing unit (1) and the discharge controller (6) on one end, and the other end is grounded. The current detector (7) is used to monitor the voltage across the resistor, which is then computed to produce the flow of current in the charge or discharge mode.

The economizer switch (8) is connected between the rechargeable battery (100) and the external power input (Vb+), and to the central processing unit (1) through the voltage regulator (9). It is used mainly to control the normal-charge of the rechargeable battery in conjunction with the central processing unit (1).

The display unit (10) connected to the central processing unit (1) displays the charge remaining in the rechargeable battery (100) to the user of a portable device.

The erasable programmable read only memory (EEPROM) (200) connected to the central processing unit (1) stores the parameter values relating to the operational status of the rechargeable battery (100).

The external communication port (300) connected to the central processing unit (1) provides a data link to transmit relevant battery operating data from the rechargeable battery (1) to an external device (not shown).

At the time a device with the apparatus for implementing smart management of a rechargeable battery is turned on or started, various operational parameters of the rechargeable battery (100) are collected by the central processing unit (1) with the assistance of various detectors previously mentioned.

To determine the current through the rechargeable battery (100), the voltage across the resistor in the current detector (7) is first measured. The central processing unit (1) is able to determine whether the rechargeable battery (100) is in a charge mode or discharge mode by testing the polarity of the voltage measured across the resistor. The measured voltage is then shifted to the linear working range of the amplifier (13) by a level shifter (12), and then the converted voltage is changed to a digital format through the A/D converter (14). Applying the Ohm's law or the current computation model, the current through the resistor either during the charge or discharge mode is therefore calculated.

To determine the terminal voltage across the rechargeable battery (100), the voltages across the two series resistors forming the detector (4) are first measured. Applying the voltage division principle or the voltage computation model, the terminal voltage across the rechargeable battery (100) is calculated.

To determine the surface temperature of the rechargeable battery (100), the relationship between the temperature and corresponding resistance are predefined and saved in the EEPROM (200). The voltage across the thermal-sensitive resistor forming the temperature detector (5) is first measured by the temperature detector (5) and converted to digital format through the A/D converter (14). The central processing unit (1) then either retrieves the corresponding temperature saved in the EEPROM (200) or uses the temperature computation model to calculate the surface temperature of the rechargeable battery (100).

In the present invention, several measures are implemented to cut down unnecessary power loss. First, the microprocessor (11), activates the cutoff switch (51) to automatically turn off the load current to the temperature detector (5) when the microprocessor (11) detects the rechargeable battery (100) idling, such that the temperature detector (5) will consume no more power. Second, the central processing unit (1) switches itself into a sleep mode for a specified time to reduce power usage when it finishes all the necessary data collection procedures and remains idle.

After the central processing unit (11) has collected all the operation data of the rechargeable battery (100), the microprocessor (11) cuts off the current to the A/D converter (14). It then forces itself to enter a sleep mode to prevent unnecessary power usage and activates a watchdog timer (16) to a preset countdown time. When the watchdog timer (16) completes the countdown, the central processing unit (1) reactivates the A/D converter (14) for the next round of data collection relating to the operation status of the of rechargeable battery.

Charging of the rechargeable battery is divided into two stages: normal charge and trickle charge. The normal charge mode under the control of the charge controller (2) charges the rechargeable battery (100) with a constant current, and the trickle charge mode slowly charges the rechargeable battery (100) with a small current. The latter can be viewed as a preliminary step to a normal charge.

Figure 3:
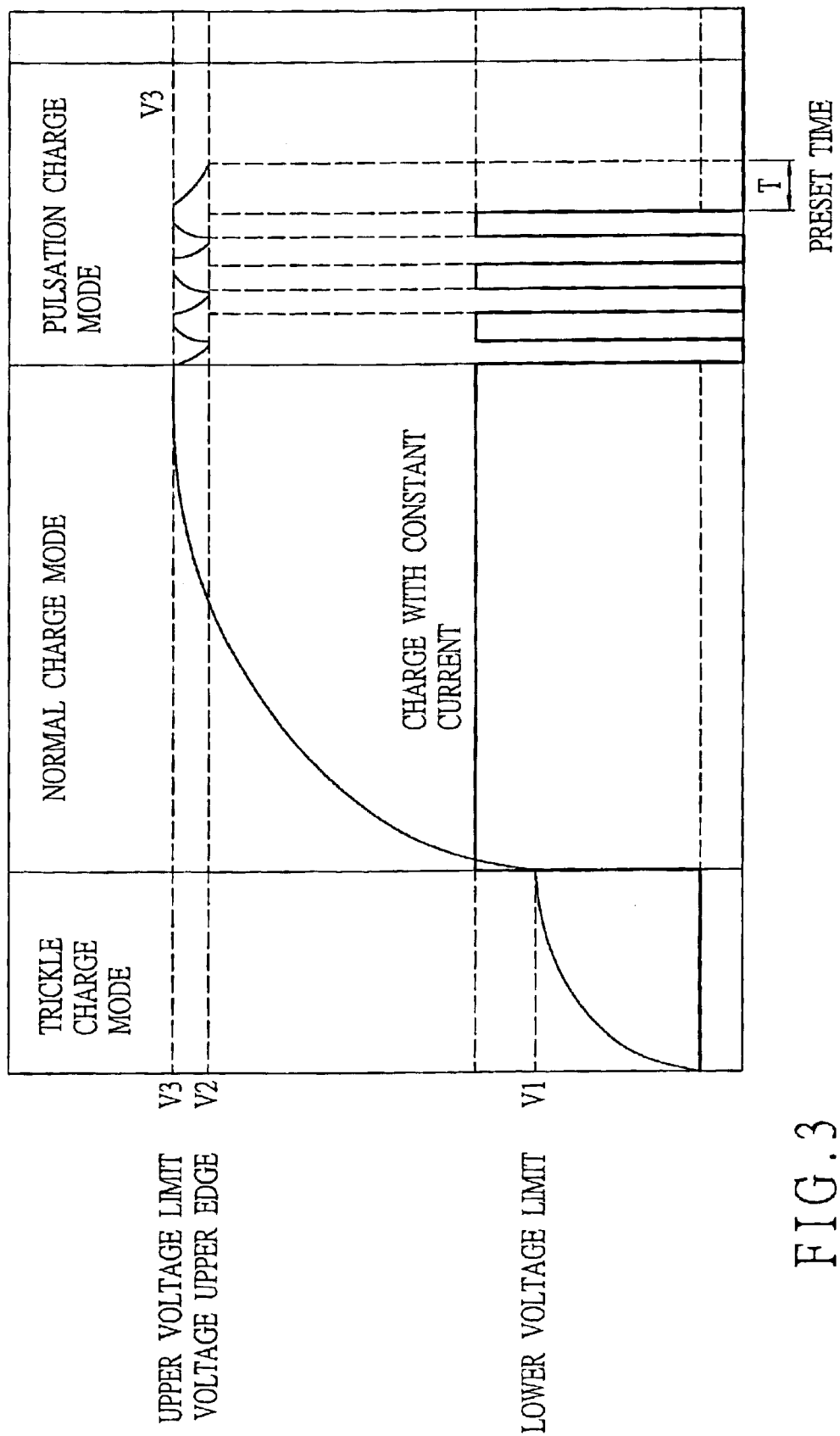
FIG. 3 is a charge characteristic curve of a rechargeable battery in different charge modes.

If the operating voltage is below a predetermined lower voltage limit ($V_1$) and the battery temperature is extremely low due to long idling, the electrolyte in the battery may start to coagulate or produce sedimentation. With additional reference to FIG. 3, under such conditions, the central processing unit (1) activates the trickle charger (3) to start slowly charging the rechargeable battery (100) and turns off the charge controller (2). Turning off the charge controller (2) prevents damage to a rechargeable battery (100) caused by charging a cold rechargeable battery (100) with a large current.

When the terminal voltage of the rechargeable battery (100) is above the lower voltage limit ($V_1$) and the surface temperature is within the upper and lower temperature limits, the central processing unit (1) activates the charge controller (2) to normally charge the rechargeable battery (100) and deactivates the trickle charger (3).

Using a constant current to normally charge a rechargeable battery will cause the battery to reach saturation sooner than using a small current, but that is only a temporary phenomena. In the present invention, once the terminal voltage of the charging rechargeable battery (100) reaches the upper voltage limit ($V_3$), the central processing unit (1) disables the charge controller (2) for a specified time (T) to allow the terminal voltage of the rechargeable battery (100) to taper off. When the voltage drops to the voltage upper edge value ($V_2$) again, the charge controller (2) is reactivated to normally charge. When the terminal voltage again reaches the upper voltage limit ($V_3$), the charge controller (2) is disabled again. The operation cycle repeats itself during the course of pulsation charging. However, when the charge controller (2) is disabled for the specified time (T) and the terminal voltage remains above the voltage upper edge value ($V_2$), the rechargeable battery (100) is fully charged, and the pulsation charge process is terminated. Experiments with both charging methods reveals that the storage capacity of the rechargeable battery (100) after pulsation charge is superior to the conventional method of charging with constant current.

If the voltage of the rechargeable battery (100) drops below the predetermined lower voltage limit ($V_1$) during discharging, the central processing unit (1) disables the discharge controller (6) and enters a self-cutoff mode. This stops further discharging of the rechargeable battery (100) and prevents over-discharging the rechargeable battery (100) and the resultant irreversible damage to the rechargeable battery (100). The voltage regulator (9) normally supplying a stable operating voltage for the internal control circuit of the rechargeable battery is also disabled by the central processing unit (1). When the voltage regulator (9) is disabled, the stored charge in the rechargeable battery (100) will not be consumed. The rechargeable battery remains disabled until it is connected to an external power source for recharging. The economizer switch (8) then reactivates the control circuit of the rechargeable battery (100) by channeling the charge current through the voltage regulator (9). The voltage regulator (9) is then reactivated to supply the operating voltage for the central processing unit (1).

Figure 4:
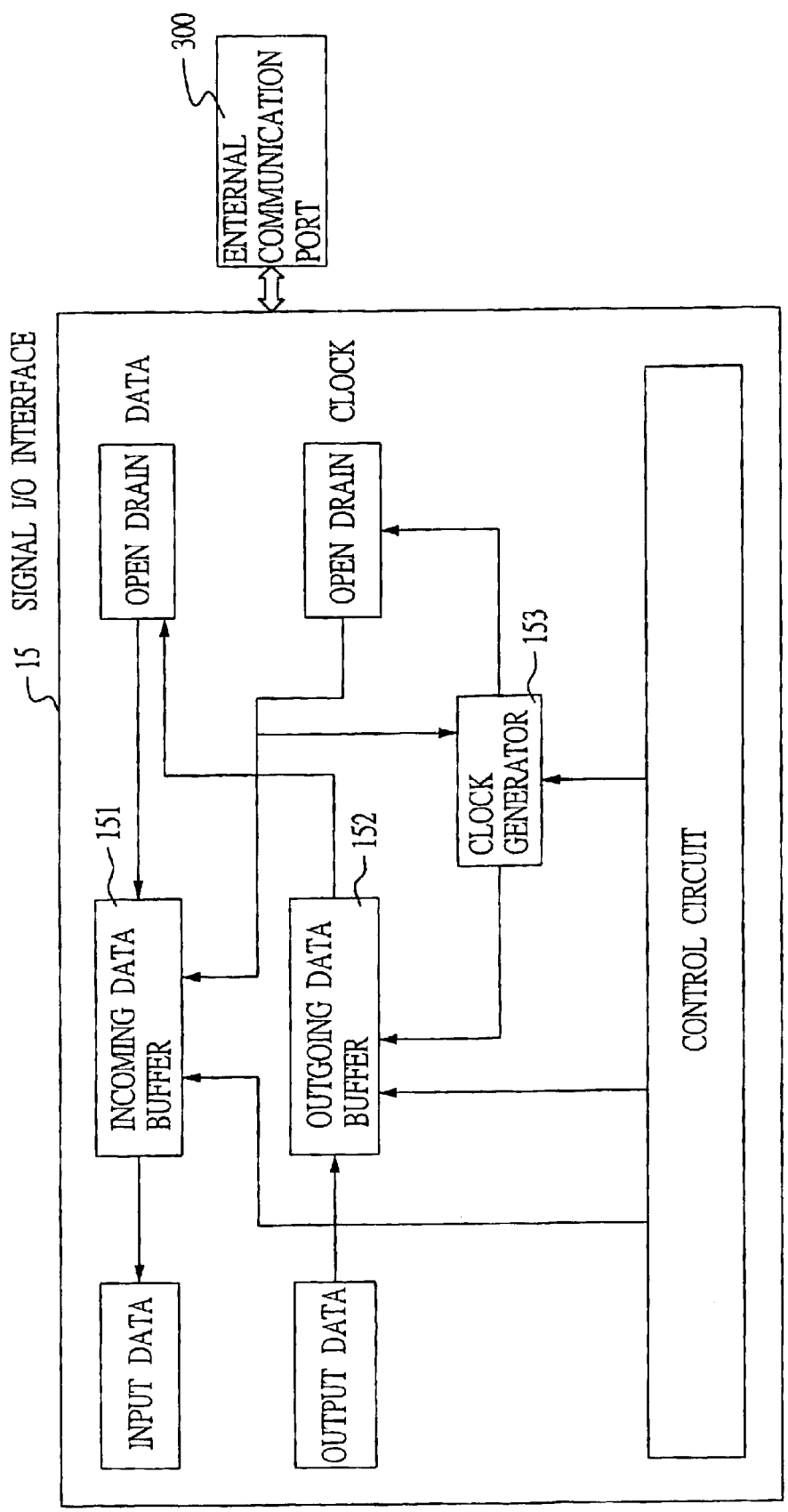
FIG. 4 is block diagram of the signal I/O interface of the central processing unit.

With reference to FIG. 4, the signal I/O interface (15) is formed by an incoming data buffer (151) and an outgoing data buffer (152). If the external communication port (300)

receives a data request for operation status of the rechargeable battery (100), the microprocessor (11) outputs the related data to the external communication port (300) through the outgoing data buffer (152). The same output data is routed through the incoming data buffer (151) to the microprocessor (11) to verify the correctness of the data. Data received from external devices is saved temporarily in the incoming data buffer (151) for subsequent processing by the microprocessor (11), with no need for a clock pulse to synchronize the transmission operation. A clock pulse generator (153) is used to generate the clock pulse for sending out data.

A unique feature of the present invention is that a battery management program with multiple control procedures is employed to help control the current flow during the charge and discharge of the rechargeable battery (100). When the central processing unit (10) executes the program, it frequently refers to the parameter values relating to the operation status of the rechargeable battery (100) for intelligent decision-making.

Figure 5A:
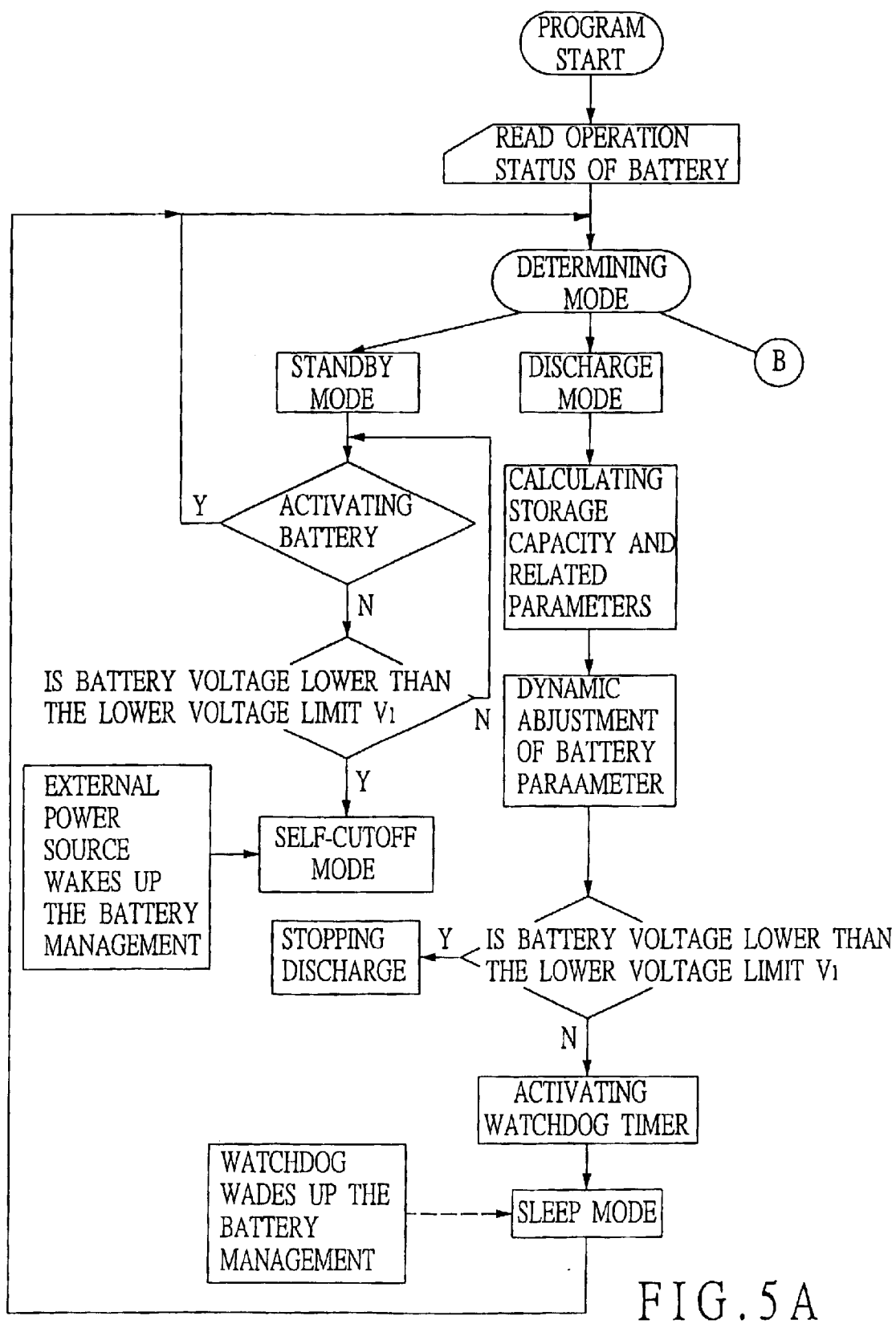
FIG. 5 is a logic diagram of the battery management program in accordance with the invention.
Figure 5B:
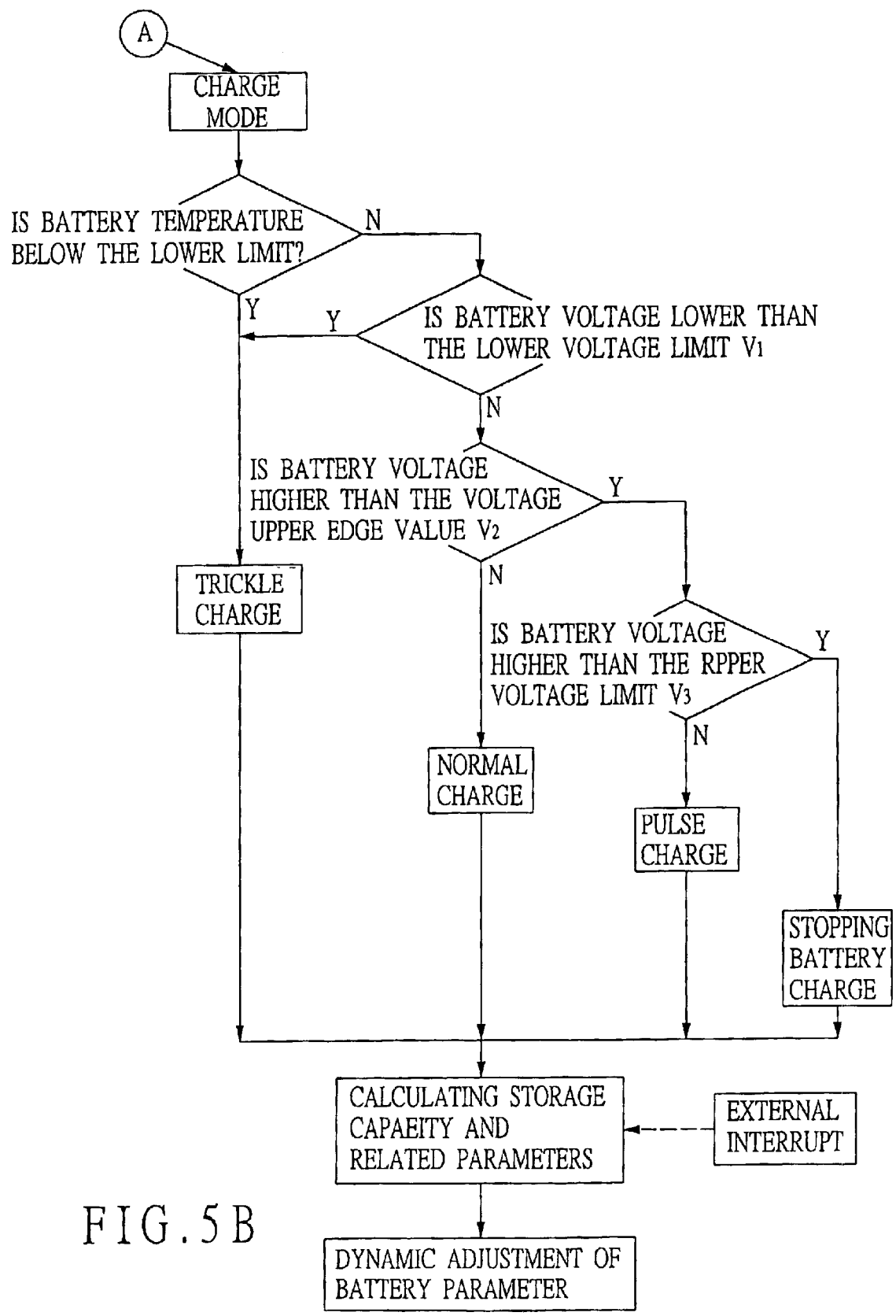

With reference to FIG. 5, when the battery management program is started, the basic operating data relating to the rechargeable battery (100) are read and saved in a register in the microprocessor (11). The data are later used for the modal decision making to determine whether the rechargeable battery (100) is in a charge mode, discharge mode or standby mode.

In the charge mode, the central processing unit (1) first measures the surface temperature of the rechargeable battery (100) to determine whether it is below a predetermined lower temperature limit. If yes, the trickle charger (3) is activated for slow charging with a small current. Otherwise, the central processing unit (1) then proceeds to check the terminal voltage of the rechargeable battery (100) whether it has reached the upper edge value ($V_2$). If no, the central processor (1) activates the charge controller (2) for normal charging, otherwise, it continues to check the terminal voltage to determine whether it has reached the upper voltage limit (V3). If yes, a signal is sent to disable the charge controller (2). Otherwise, the charge controller (2) is activated for pulsation charging.

The central processing unit (1) in control of the charge battery operation may output a control signal to enable either the trickle charger (3) for slow charging, the charge controller (2) for normal charging or pulsation charging, based on the periodic feedback of parameter values from the rechargeable battery (100). Alternatively, it may output a signal to disable the battery charging, and proceed to revise the current parameter values relating to the operating data of the rechargeable battery and calculate the storage capacity of the rechargeable battery, which are used for dynamic adjustment of the battery operation parameters in response to situations like changes in ambient temperature or increase of battery use time. The central processing unit (1) then activates the watchdog timer (16) forcing itself to enter a sleep mode for optimizing power consumption. The watchdog timer (16) is preset with a specified time for counting down. When the watchdog timer (16) has completed the countdown, it reactivates the central processing unit (1) for a new round of decision-making to determine the appropriate charge mode.

In the discharge mode, the central processing unit (1) first calculates the storage capacity of the rechargeable battery (100) and related parameter values, which are used for dynamic adjustment of the battery operation parameters. It then checks whether the terminal voltage of the rechargeable battery (100) is below the predetermined lower voltage limit ($V_1$). If yes, it outputs a signal to disable the discharge controller (6). Otherwise, it activates the watchdog timer (16) and forces itself to enter a sleep mode. When the watchdog timer (16) has completed the countdown of specified time, the central processing unit (1) is reactivated for another round of decision-making to determine the appropriate operation mode for the rechargeable battery (100).

In the standby mode, the central processing unit (1) first uses the current flow computation model to compare the charge/discharge current flow across the rechargeable battery (100) to make sure the rechargeable battery (100) is activated. If yes, it then reverts back to the modal decision-making to determine whether it is in a charge or discharge mode. Otherwise, it checks the terminal voltage to determine whether it has reached the predetermined lower voltage limit ($V_1$). If yes, it enters self-cutoff mode to cut off the voltage regulator (9) so that the battery control circuit consumes no more power from the rechargeable battery (100). Otherwise, it stays in the standby mode, until the rechargeable battery (100) is connected to an external power source for recharging. The economizer switch (8) then wakes up the voltage regulator (9).

Since the battery control circuit also accepts data inquiry from other systems with respect to the status of battery operation, an interrupt procedure may be executed at any time during charge/discharge of the rechargeable battery (100). In such case, the system stops the current battery management function or wakes up from the sleep mode and processes the external inquiry on a priority basis. After fulfilling the data request, the system then returns to the previous battery management function.

The present invention incorporates the following features:

(1) To prevent harmful charging of the rechargeable battery with a large current when the battery temperature is below the predetermined lower temperature limit, a trickle charger is used to slowly charge the rechargeable battery with a small current. This current control means is able to activate the electrolyte in the rechargeable battery in preparation for a normal charge.

(2) When the stored charge in the rechargeable battery reaches a dangerously low level, the discharge controller is disabled to cut off the discharge circuit, and the system enters a self-cutoff mode with no more power drained from the rechargeable battery. This control means can prevent possible destruction of the rechargeable battery due to over discharging.

(3) In case the temperature detector is not active, the central processing unit turns off the cutoff switch and in turn cuts off the load current to the temperature detector such that no more power is drained from the rechargeable battery.

(4) Unlike the prior arts, the signal I/O interface is formed by an incoming data buffer and an outgoing data buffer rather than using a single buffer. The output data relating to the operation status of the rechargeable battery is channeled through the incoming data buffer to the microprocessor to check the correctness of the data.

(5) To manage the battery precisely, monitor over individual rechargeable battery cells in a battery pack is needed. Since the current flow through conductors causes voltage drop, measured voltages are not the actual voltages of battery cells. To correct the measurement, voltage drops along conductors are calculated and compensated.

Considering the foregoing features and advantages, the present invention is more advantageous than conventional methods. The preferred embodiment of the present invention is intended to be illustrative only, and under no circumstances should the scope of the present invention be so restricted.

What is claimed is:

1. A method for implementing smart management of a rechargeable battery, which comprises the steps of:

first measuring the operating parameter values of a rechargeable battery including voltage, surface temperature and charge/discharge current to determine whether the rechargeable battery is in the charge mode, discharge mode or standby mode in a modal decision making process;

determining whether to use trickle charge, normal charge or pulsation charge in the charge mode control procedure, based on the terminal voltage and the surface temperature of the rechargeable battery measured;

determining whether to stop the discharging of the rechargeable battery in the discharge mode control procedure, based on the voltage value measured;

determining the cell voltage compensating the voltage drop over conductor between cells; and determining whether to enter a self-cutoff mode in the standby mode control procedure, based on the voltage value measured.

2. A method for implementing smart management of a rechargeable battery as claimed in claim 1, wherein the method comprises a charge mode control procedure such that:

switches the rechargeable battery to trickle charge with a small current if the surface temperature of the rechargeable battery is below a predefined lower temperature limit; and switches to a normal charge mode if the surface temperature of the rechargeable battery is above the predefined lower temperature limit and the voltage value is between the predefined lower voltage limit and the upper edge value; and finally switches to a pulsation charge mode if the voltage value is between the predetermined upper voltage limit and the upper edge value.

3. A method for implementing smart management of a rechargeable battery as claimed in claim 1, wherein the method comprises a discharge mode control procedure such that:

the discharge from the rechargeable battery is stopped if the voltage value of the rechargeable battery is below the predetermined lower voltage limit in discharge mode.

4. A method for implementing smart management of a rechargeable battery as claimed in claim 1, which comprises a standby mode control procedure such that:

the system is switched to a self-cutoff mode if the rechargeable battery is idling and the voltage value is below the predetermined lower voltage limit.

5. A method for implementing smart management of a rechargeable battery as claimed in claim 2, wherein the method comprises a post-charge/discharge procedure such that:

when the rechargeable battery is recharged, the central processing unit updates the operation parameter values of the rechargeable battery, the system is switched to a sleep mode to economize power for a preset time; and when the preset time is complete, the system returns from the sleep mode to the modal decision making to check the operation condition, based on the periodic feedback of parameter values from the rechargeable battery.

6. A method for implementing smart management of a rechargeable battery as claimed in claim 3, wherein the method comprises a sleep mode control procedure such that:

the rechargeable battery is switched to the sleep mode to economize power if the terminal voltage is above the predetermined lower voltage limit in a discharge mode; after a preset time it then departs from the sleep mode and returns to the modal decision making to check the operation mode based on the feedback of parameter values from the rechargeable battery.

7. A method for implementing smart management of a rechargeable battery as claimed in claim 2, wherein the method comprises a pulsation charge control procedure such that:

if the terminal voltage value is above the upper edge value in a pulsation charge mode, the rechargeable battery starts to charge until the voltage reaches the predetermined upper voltage limit and then stops charging; and when the voltage value gradually drops back to the limit of the upper edge value, the charge operation is resumed, starting over again after completing one cycle during the course of pulsation charge; and when the charge operation is stopped for a specified time and the voltage value remains above the upper edge value, the pulsation charge is then terminated and the rechargeable battery is fully charged.

8. A method for implementing smart management of a rechargeable battery as claimed in claim 1, wherein the method comprises an interrupt procedure such that:

when a data request is received from an external circuit demanding the operation status of the rechargeable battery including the terminal voltage, surface temperature and charge/discharge current flow, the requested data is sent to the external circuit and channeled through the data buffer back to the central processing unit for data verification.

9. An apparatus for implementing smart management of a rechargeable battery, wherein the apparatus comprises:

a central processing unit respectively connected to a voltage detector, a temperature detector for measuring the surface temperature of the rechargeable battery, a current detector for measuring the terminal voltage and a current flow detector for measuring the flow of current in charge/discharge of the rechargeable battery;

a memory for saving the parameter values including the terminal voltage, temperature and charge/discharge current with respect to the rechargeable battery;

a charge controller connected between the rechargeable battery and an external power input and whose operation is controlled by the central processing unit (1); whereby if the surface temperature of the rechargeable battery is between a predetermined upper and lower temperature limit in the charging mode, the central processor unit activates the charge controller to provide constant current for charging the rechargeable battery;

a trickle charger connected between the rechargeable battery and the external power input whose operation is controlled by the central processing unit; whereby if the surface temperature of the rechargeable battery is below a predetermined lower temperature limit, the central processing unit turns off the charge controller and activates the trickle charger for slow charging the rechargeable battery with a small current; and a discharge controller connected between the central processing unit and the rechargeable battery; whereby if the rechargeable battery is below the discharge limit, the central processing unit (1) disables the controller to prevent irreversible damage to the rechargeable battery.

10. An apparatus for implementing smart management of a rechargeable battery as claimed in claim 9, wherein the central processing unit is connected to a voltage regulator for supplying the operating voltage for the central processing unit; whereby if the terminal voltage of the rechargeable battery is below the predetermined lower voltage limit, the voltage regulator is turned off and the central processing unit enters a self-cutoff mode.

11. An apparatus for implementing smart management of a rechargeable battery as claimed in claim 10, wherein the voltage regulator is connected to the rechargeable battery through an economizer switch, and further connected to the external power input; whereby if the rechargeable battery is connected to an external source for recharging, the economizer switch provides a current to activate the voltage regulator.

12. An apparatus for implementing smart management of a rechargeable battery as claimed in claim 9, wherein the a temperature detector is connected in series with a cutoff switch; whereby if the rechargeable battery is found idling, the switch is disabled to cut off the load current to the temperature detector to stop further power loss from the rechargeable battery.

13. An apparatus for implementing smart management of a rechargeable battery as claimed in claim 9, wherein the central processing unit comprises an A/D converter and a microprocessor; whereby the A/D converter converts the parameter values associated with the rechargeable battery, including the terminal voltage, temperature and charge/discharge current flow, to a digital format for processing by the microprocessor.

14. An apparatus for implementing smart management of a rechargeable battery as claimed in claim 9, wherein the central processing unit is connected to a monitor to display the charge remaining in the rechargeable battery.

15. An apparatus for implementing smart management of a rechargeable battery as claimed in claim 9, wherein the memory is an electrically erasable programmable read only memory (EEPROM).

16. An apparatus for implementing smart management of a rechargeable battery as claimed in claim 9, wherein the central processing unit comprises a signal I/O interface formed by an incoming data buffer and an outgoing data buffer.

* * * * *

UNITED STATES PATENT AND TRADEMARK OFFICE
CERTIFICATE OF CORRECTION

PATENT NO. : 6,771,042 B2  Page 1 of 1
APPLICATION NO. : 10/302458
DATED : August 3, 2004
INVENTOR(S) : Chen et al.

It is certified that error appears in the above-identified patent and that said Letters Patent is hereby corrected as shown below:

On the Title Page
    Item should read,
(73) Assignee: Avid Electronics Corp., Hsinchu (TW)
        --Semcity Technology Corp., Hsinchu (TW)--

Signed and Sealed this

Third Day of November, 2009

David J. Kappos
*Director of the United States Patent and Trademark Office*